US010809482B2

(12) United States Patent
Childers et al.

(10) Patent No.: US 10,809,482 B2
(45) Date of Patent: Oct. 20, 2020

(54) STRAIN RELIEF FOR THE FIBER OPTIC SHUFFLE CASE

(71) Applicant: US Conec, Ltd, Hickory, NC (US)

(72) Inventors: Darrell R. Childers, Hickory, NC (US); Craig M. Conrad, Hickory, NC (US); Arnold Deal, III, Hildebran, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 16/246,015

(22) Filed: Jan. 11, 2019

(65) Prior Publication Data

US 2019/0219788 A1 Jul. 18, 2019

Related U.S. Application Data

(60) Provisional application No. 62/616,871, filed on Jan. 12, 2018.

(51) Int. Cl.
*G02B 6/44* (2006.01)
*G02B 6/38* (2006.01)

(52) U.S. Cl.
CPC ......... *G02B 6/4478* (2013.01); *G02B 6/3887* (2013.01)

(58) Field of Classification Search
CPC .... G02B 6/443; G02B 6/4401; G02B 6/4486; G02B 6/4495; G02B 6/44
See application file for complete search history.

(56) References Cited

U.S. PATENT DOCUMENTS

| 6,464,404 | B1 | 10/2002 | Robinson et al. | |
| 6,517,253 | B1* | 2/2003 | Graesser | G02B 6/389 |
| | | | | 385/136 |
| 6,554,483 | B1 | 4/2003 | Sun et al. | |
| 6,619,853 | B2 | 9/2003 | Grois et al. | |
| 6,763,166 | B2 | 7/2004 | Yow et al. | |
| 6,816,662 | B2* | 11/2004 | Doss | G02B 6/25 |
| | | | | 385/134 |
| 6,947,655 | B2 | 9/2005 | Rubino et al. | |
| 9,128,214 | B2 | 9/2015 | Wakjira et al. | |
| 10,042,137 | B2 | 8/2018 | Conrad et al. | |
| 2018/0341080 | A1 | 11/2018 | Conrad et al. | |

FOREIGN PATENT DOCUMENTS

WO 2013179198 A1 12/2013

\* cited by examiner

*Primary Examiner* — Jennifer Doan
(74) *Attorney, Agent, or Firm* — Michael L. Leetzow, P.A.; Shubhrangshu Sengupta (57) ABSTRACT

A device for rearranging optical fibers has a proximal and distal ends. The ends have openings therein to allow optical fibers to pass therethrough. A crimp band may be included at either end to provide strain relief to the optical fibers as they enter and exit from the device. A lid with latches is also provided to assist with organization, security, and compression of the optical fibers. A tool is also provided to disengage the lid from the device.

17 Claims, 12 Drawing Sheets

STRAIN RELIEF FOR THE FIBER OPTIC SHUFFLE CASE

REFERENCE TO RELATED CASE

This application claims priority under 35 U.S.C. § 119 (e) to provisional application No. 62/616,871 filed on Jan. 12, 2018, the contents of which are hereby incorporated by reference in their entirety.

BACKGROUND OF THE INVENTION

Field of the Invention

Optical fiber cables and ribbons typically have twelve optical fibers or sets of twelve optical fibers. The optical fibers in these sets of optical fibers are colored and are in a particular order, thereby allowing those working with the optical fibers an easy way to identify the optical fibers within each set. As is known in the art, the colors and order of the optical fibers is blue, orange, green, brown, slate, white, red, black, yellow, violet, rose, and aqua. However, there are situations where the optical fibers of one color from a number of sets of optical fibers need to be arranged in a grouping. For example, the blue optical fibers from a number of fiber optic ribbons need to be grouped together. These groupings of optical fibers then can be ribbonized, bundled, placed in a heat shrink tube, or covered with a cable jacket or other protective device. The device used for this procedure is generally known as a optical fiber shuffle.

Most of the optical fiber shuffles have been used with an electronics board where the optical fibers or assemblies of optical fibers would not experience applied forces. The entering and exiting optical fiber assemblies are taped or epoxied in place in the optical fiber shuffle case, and they are not intended to experience strain. Forces on either or both of the entering and exiting fiber assemblies could cause strains in the optical fibers that could render them useless for the transmission of signals or cause them to fracture.

The optical fiber shuffle may also include a fiber comb to separate and maintain the order of the shuffled optical fibers. However, it is important that the fiber comb hold tight tolerances in order to function appropriately—preventing the shuffled optical fibers from passing each other in the fiber comb. Forming a fiber comb separate from the remainder of the optical fiber shuffle is provided.

Thus, a device that allows for optical fibers to be easily and repeatedly shuffled or reorganized while also providing strain relief is needed.

SUMMARY OF THE INVENTION

The present invention is directed to a device for reorganizing optical fibers from a first grouping to a second grouping that includes a proximal end having at least one opening, the at least one opening engaging a proximal crimp body, the optical fibers passing through the proximal crimp body and the at least one opening, and a distal portion having a first plurality of openings through which the optical fibers pass, each of the first plurality of openings having a divider therebetween, each opening in the first plurality of openings having a width that is less than twice the optical fibers' diameter.

In some embodiments, the proximal end has a plurality of openings, each of the plurality of openings engaging a proximal crimp body.

In some other embodiments, the proximal crimp body engages a structure in the opening to prevent relative movement between the proximal crimp body and the proximal end.

In another embodiment, a device for reorganizing optical fibers from a first grouping to a second grouping includes a proximal end having at least one opening, the at least one opening engaging a proximal crimp body, the optical fibers passing through the proximal crimp body and the at least one opening, a distal portion having a first plurality of openings through which the optical fibers pass, each of the first plurality of openings having a divider therebetween, each of the first plurality of openings having a width that is less than twice the optical fiber's diameter, and two side walls extending between the proximal and distal portion to form a generally rectangular structure.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
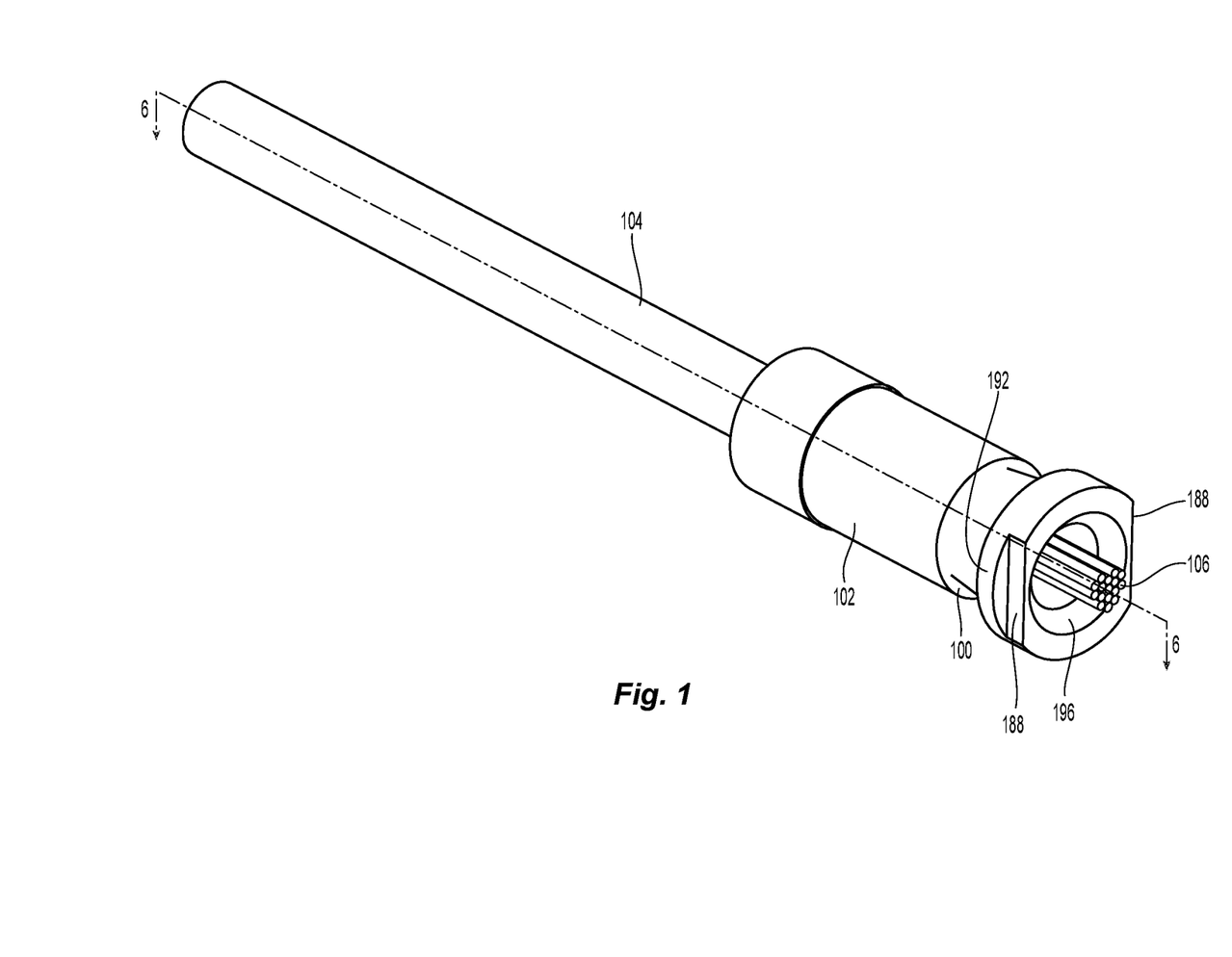
FIG. 1 is a perspective view of optical fibers inside one embodiment of a crimp body for use with an embodiment of a device for reorganizing optical fibers according to the present invention.

FIG. 1 illustrates one embodiment of a proximal crimp body 100 with a proximal crimp band 102 attached to a protective covering 104 that includes a set of optical fibers 106. Typically, the optical fibers 106 are disposed in the protective covering 104 that may include a jacketed cable, a plain tube, or a heat shrink tube. A portion of the protective covering 104 is secured between the proximal crimp body 100 and the proximal crimp band 102 to provide a basis for the strain relief. There are typically 12 optical fibers in the protective covering 104, but there may be more or fewer within the protective covering 104. Additionally, the optical fibers 106 may be loose within the protective covering 104 or they may be ribbonized or have some other arrangement. However, the optical fibers 106 in a cable or ribbon are in order by color: blue, orange, green, brown, slate, white, red, black, yellow, violet, rose, and aqua.

Figure 2:
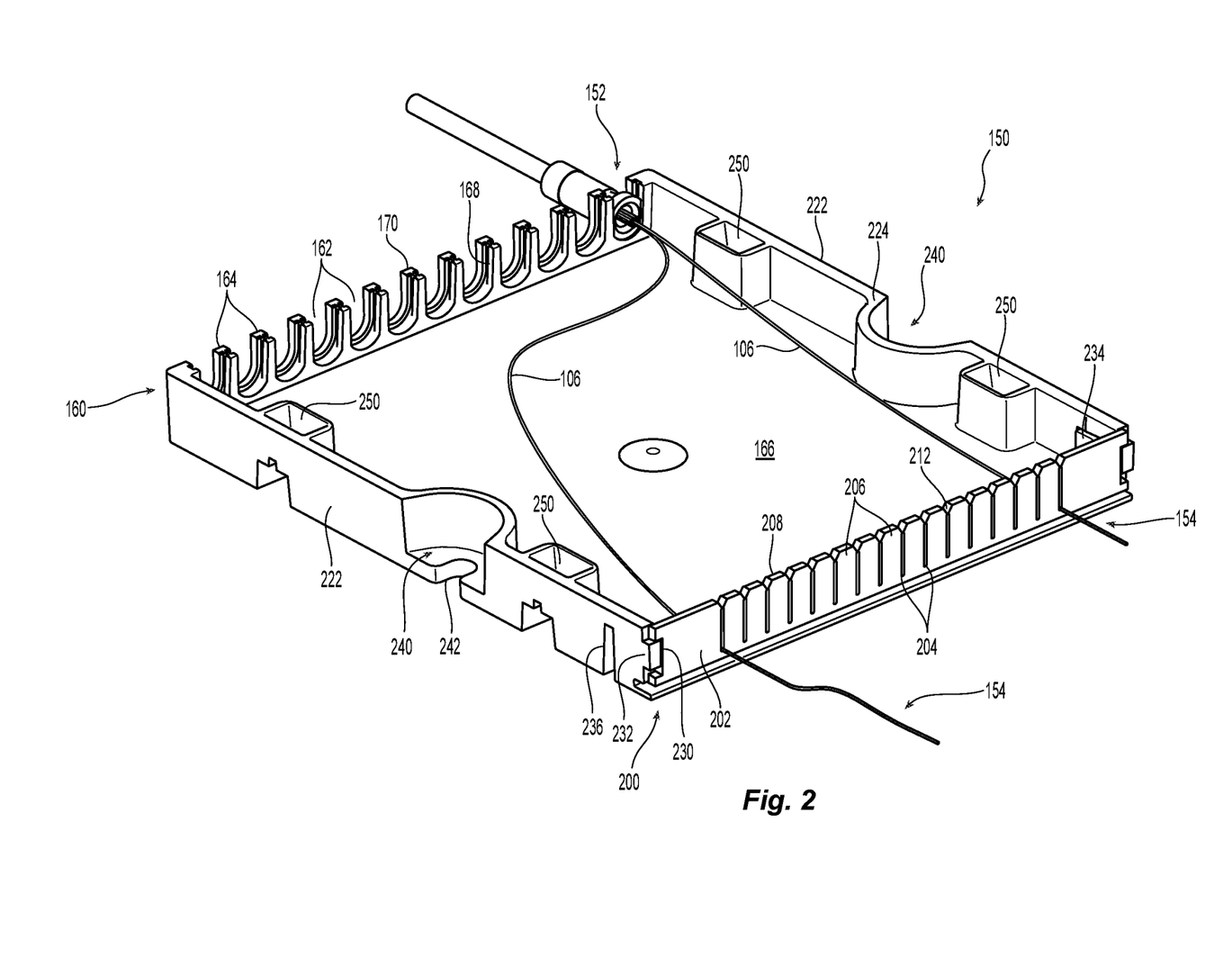
FIG. 2 is a top perspective view of one embodiment of a device for reorganizing optical fibers according to the present invention and to be used with the crimp body and optical fibers of FIG. 1.
Figure 3:
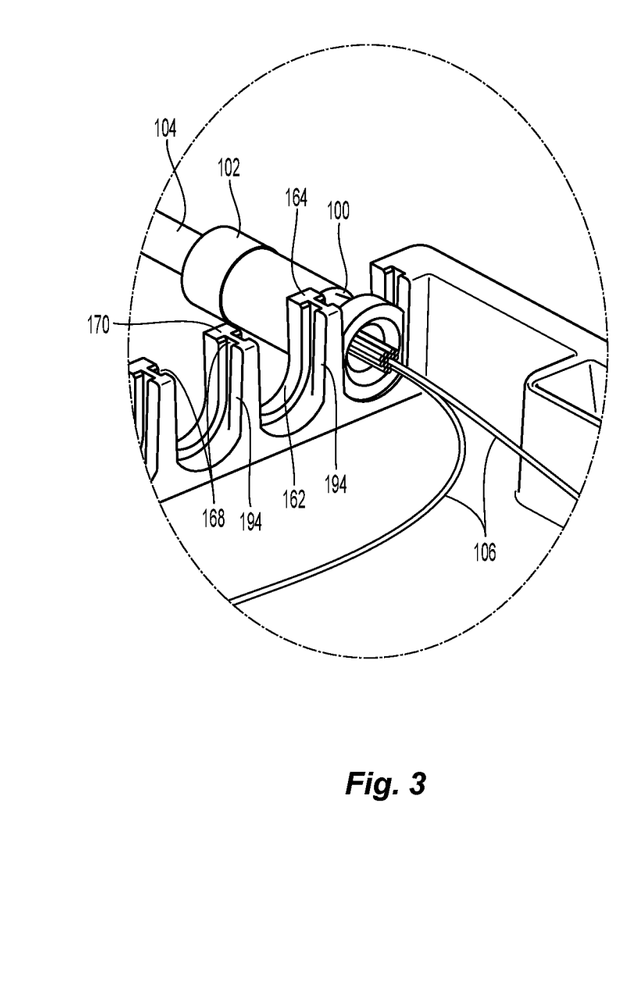
FIG. 3 is a perspective view of an enlarged portion of the proximal end of the device for reorganizing optical fibers of FIG. 2.
Figure 4:
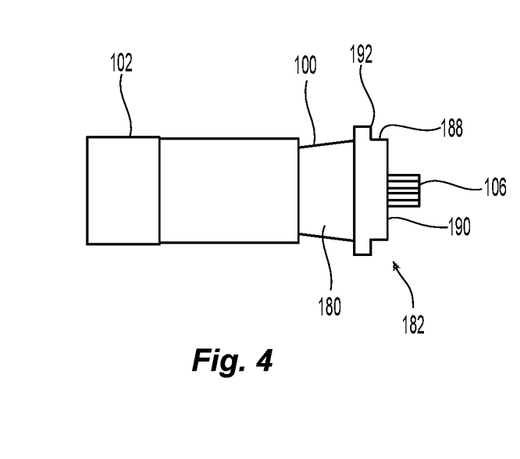
FIG. 4 is a top planar view of the crimp body and optical fibers of FIG. 1.

A device 150 for reorganizing optical fibers 106 from a first grouping or set 152 to a second grouping or set 154 is illustrated in FIG. 2. While only one set and two optical fibers 106 are illustrated in FIG. 2, a number of sets with a number of optical fibers 106 can be used in the device 150. See also FIGS. 7 and 9. The device 150 has a proximal end 160 having a number of openings 162 through which the optical fibers 106 in the first grouping 152 pass. There would be a number of proximal crimp bodies 100 (as used herein, "crimp body" means the crimp body and crimp band unless otherwise noted) at the proximal end 160. As illustrated in FIGS. 2 and 3, the openings 162 are essentially U-shaped and include a divider 164 between each of the openings to define each of the openings 162. The device 150 also has bottom portion 166, which may extend the length and width of the device 150 and acts as a tray to support and protect the optical fibers 106 from the surface on which the device 150 is placed.

Returning to the proximal end 160 and the openings 162, each divider 164 has a slot 168 on either side thereof that extends from the top 170 of the dividers towards the bottom portion 166. Thus, each opening 162 has a slot 168 on each side to engage the proximal crimp body 100.

Figure 5:
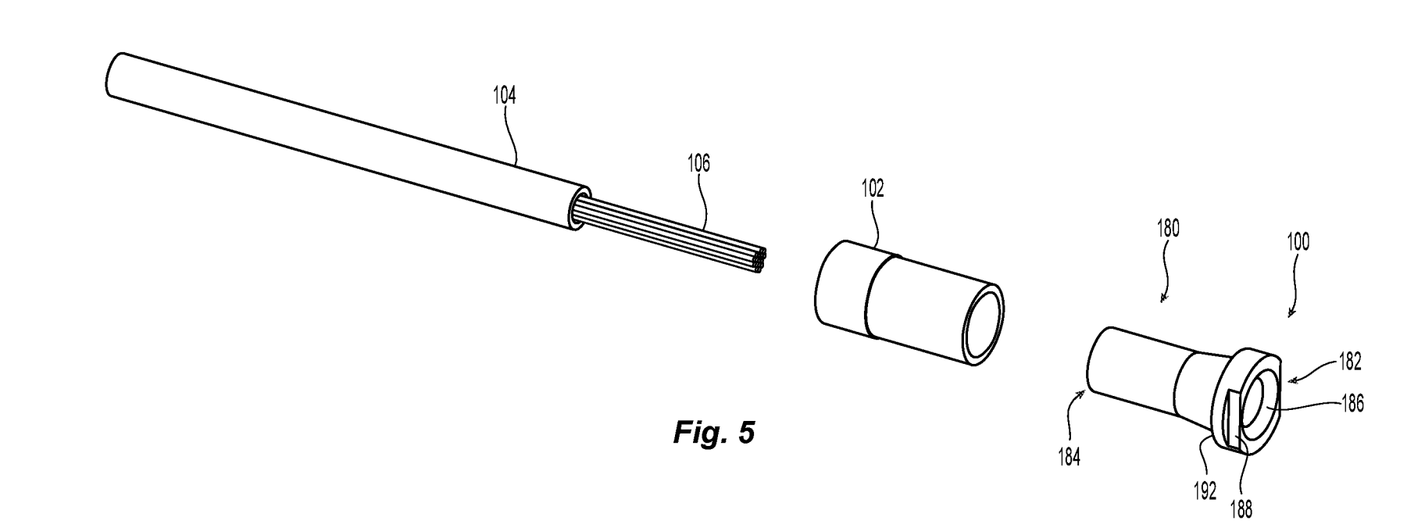
FIG. 5 is an exploded view of the crimp body and optical fibers of FIG. 1.

The proximal crimp body 100 has a main body 180 that extends between a front end 182 and rear end 184 (see, e.g., FIG. 5). An opening 186 to receive the optical fibers 106 extends the length of the proximal crimp body 100. The front end 182 of the main body 180 is generally circular and engages the device 150. However, the front end 182 of the main body 180 has two flat surfaces 188 on opposite sides of the opening 186 to provide a keying feature of the proximal crimp body 100. The two flat surfaces 188 extend only partially in a rearward direction from the front face 190, leaving the back portion 192 of the front end 182 in a circular configuration. The back portion 192 has a thickness that corresponds to the width of the slots 164 in the device 150. The two flat surfaces 188 also engage an inside portion 194 of the divider 164 to prevent rotation of the proximal crimp body 100 relative to the device 150.

Figure 6:
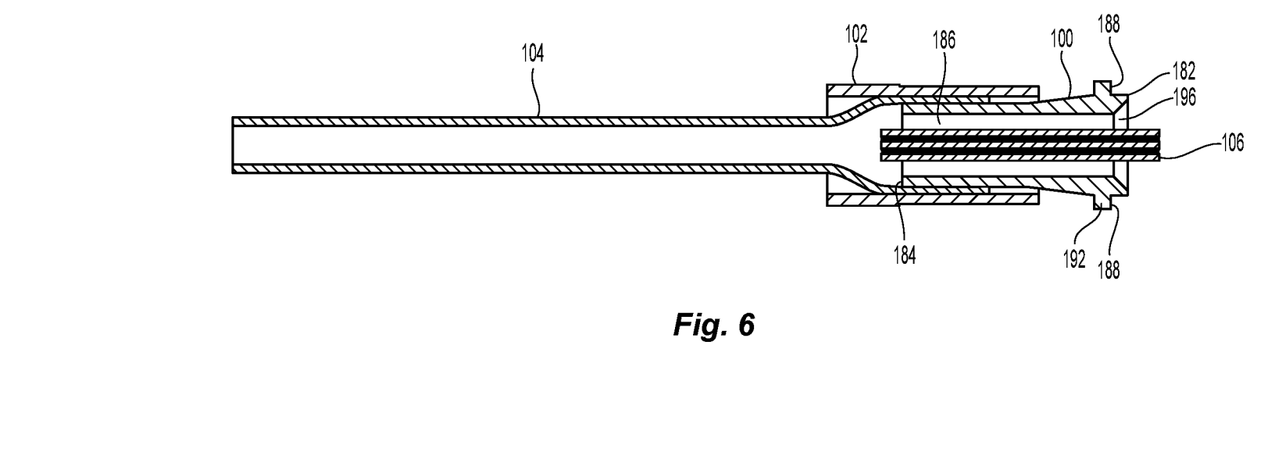
FIG. 6 is a cross sectional view from the top of the crimp body and optical fibers of FIG. 1.

As best illustrated in FIGS. 1 and 6, the opening 186 to receive the optical fibers 106 preferably has at the front end 182 a chamfered surface 196. The chamfered surface 196 helps to protect the optical fibers 106 from making sharp bends or hitting sharp surfaces, which may cause transmission errors.

The proximal crimp band 102 is placed around the main body 180 of the proximal crimp body 100 from the rear end 184, and then is crimped to the proximal crimp body 100, securing a portion of the protective covering 104 therebetween.

The device 150 also has at the distal end 200 a fiber comb 202 with number of openings 204 to receive and organize the individual optical fibers 106. There may be a different number of openings at the proximal end 160 and the distal end 200 or there may be the same number at each end.

The openings 204 at the distal end 200 also have a number of dividers 206. The dividers 206 have a top surface 208 and the openings 204 are vertical relative to the device 150. As illustrated in more detail in FIG. 2, the openings 204 extend from the top surface 208 towards the bottom portion 166. In this configuration, the optical fibers 106 are positioned on top of one another rather than side-by-side. The openings 204 have a width that is preferably smaller than the width of two optical fibers (bare optical fibers have a diameter and thus a width of about 125 microns). Thus, the openings 204 would have a width of less than 250 microns to prevent bare optical fibers 106 from moving in order relative to one another. If the optical fibers 160 are coated, then they have a diameter of 250 microns and the openings would then be less than 500 microns. Once an optical fiber 106 is placed within the opening 204, the order does not change relative to the other fibers in the opening 204. Thus, if an optical fiber 106 is placed in the opening 204 as the third one, it will not be able to slide past other optical fiber and change positions (to second or fourth) within the opening 204.

The dividers 206 in the fiber comb 202 at the distal end 200 also have a chamfered surface 212 that extends from the top surface 208 towards to the bottom portion 166 to assist in inserting the optical fibers 106 into the correct opening 204 to make the second grouping or set 154.

The device 150 also has side walls 222 to assist in protecting the optical fibers 106. The two side walls 222 extend from the proximal end 160 to the distal end 200 and have a top surface 224, which is parallel to and even with the top surfaces of the dividers 164, 206.

As noted above, the fiber comb 202 is preferably removably attached at the distal end 200. By removably attached, Applicant means that the fiber comb 202 and the device 150 are intended to and can repeatedly engage and disengage one another without any other elements (e.g., glues, adhesives, bands, etc.), structures, or destroying any portions or parts that are intended to be used to attach fiber comb 202 and the device 150. In this case, the fiber comb 202 has a notch or groove 230 on either side to receive a tongue or projection 232 on the walls 222. Additionally, the fiber comb 202 has latches 234 at either end to engage an opening or indentation 236 in the walls 222 and secure the fiber comb 202 at the distal end 200. The fiber comb 202 need not be precise in its attachment to the walls 222 of the device 150. Rather, it is the width of the openings 204 that are preferably precisely molded.

The device 150 also has two locations 240 where the bottom portion 166 extends beyond the walls 222 (which jut inward). These locations 240 serve at least two purposes. The first is that the locations, which are semi-circularly shaped, have a opening 242 to receive a screw, rivet, or other fastener by which a user could secure the device 150 to a structure (not shown). The locations also are useful to push the device 150 onto a tool to disengage a lid, as described in more detail below.

The device 150 may also have four passageways 250 adjacent to the sides 222 of the device 150 to receive latches from the lid. Again, the detail of these passageways 250 and the lid latches are described in more detail below. See FIGS. 12 and 13.

Figure 7:
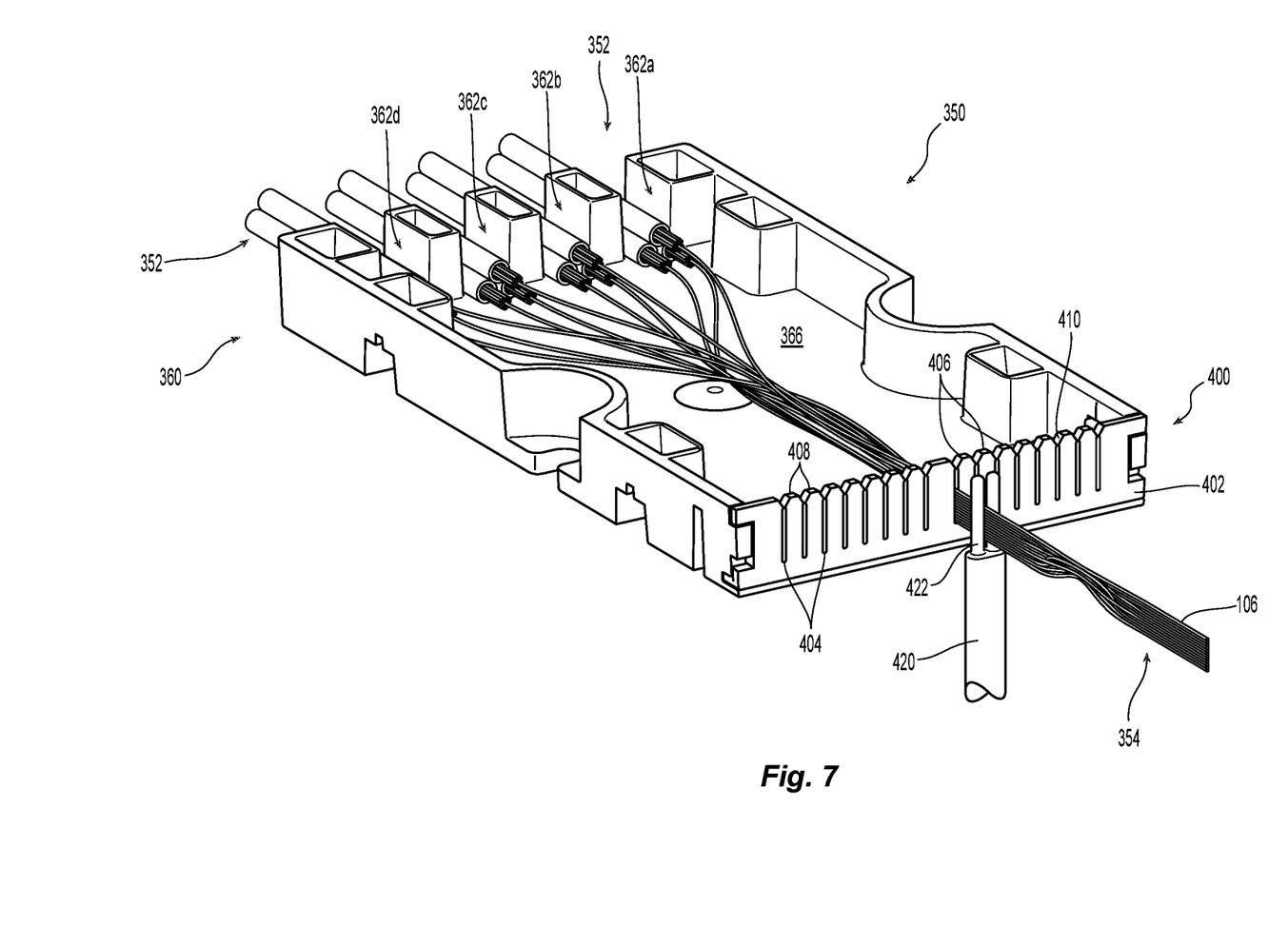
FIG. 7 is a top perspective view of a second embodiment of a device for reorganizing optical fibers according to the present invention using a separate fiber comb and pin comb tool.
Figure 8:
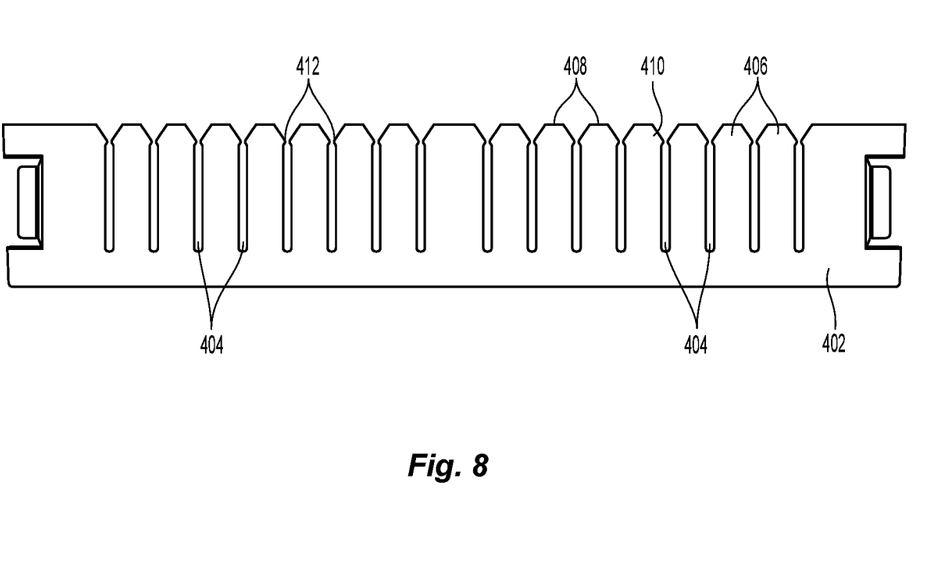
FIG. 8 is a front elevational view of the fiber comb in FIG. 7.

A second embodiment of a device 350 for reorganizing optical fibers 106 from a first grouping or set 352 to a second grouping or set 354 is illustrated in FIGS. 7 and 8. The device 350 has a proximal end 360 having a number of openings 362 through which the optical fibers 106 in the first grouping 352 pass. The openings 362 in this embodiment are essentially U-shaped and include a divider 364 between each of the openings to define each of the openings 362. The device 350 also has bottom portion 366 to assist in defining the openings 362 and which may extend the length and width of the device 350 and acts as a tray to support and protect the optical fibers 106 from the surface on which the device 350 is placed.

The order of the optical fibers 106 in the first and second groupings are determined by the order and placement of the optical fibers 106 (and the first groupings 352) in the proximal end 360. As illustrated in FIG. 7, the order is determined as follows: in the opening 362a are the first, second and ninth grouping; opening 362b has the third, fourth and tenth groupings; opening 362c has the fifth, sixth and eleventh groupings, and opening 362d has the seventh, eighth and twelfth groupings. The groupings 1 through 8 are on the first layer, two to each opening, and move from right to left in FIG. 7. Groupings 9-12 are the second layer and are laid on top of the first layer and move from right to left in FIG. 7. As a result, but for the present patent application, the aligning of the optical fibers 106 from each of the first groupings 352 can be quite difficult and be error prone. The present invention makes it easier to align and reorder optical fibers, and reduces errors.

The device 350 also has a distal end 400 with a fiber comb 402 with number of openings 404 to receive and organize the individual optical fibers 106. In the example illustrated in FIG. 7, the second group and has only the blue optical fiber (or the first optical fiber), with similar second groupings for other optical fiber colors after the optical fibers exit the fiber comb 402, although the order shown in not limiting. There may be a different number of openings at the proximal end 360 and the distal end 400 or there may be the same number at each end. The fiber comb 402 may also be removably attached, fixedly attached, or integrally formed with the remainder of the device 350.

The openings 404 at the distal end 400 also have a number of dividers 406. The dividers 406 have a top surface 408 and the openings 404 are vertical relative to the device 350. As illustrated in more detail in FIG. 8, the openings 404 extend from the top surface 408 towards the bottom portion 366. In this configuration, the optical fibers 106 are positioned on top of one another rather than side-by-side. The openings 404 have a width that is preferably smaller than the width of two optical fibers (optical fibers have a diameter and thus a width of about 125 microns). Thus, the openings 404 would have a width of less than 250 microns to prevent the optical fibers 106 from moving in order relative to one another. Again, these numbers are doubled if the optical fibers are coated.

The dividers 406 preferably have a chamfered surface 410 that extends from the top surface 408 towards to the bottom portion 366. At the end of the chamfered surface 410 is a projection 412 that extends into the opening 404. The projections 412 narrow the openings 404 to less then the width of an optical fiber—125 microns. The dividers 406 are somewhat resilient and can be moved slightly, for example, upon application of an external force by a user, as the fibers are inserted into the opening 404. Thus, when an optical fiber 106 is inserted into the opening 404, at least one of the dividers 406 on either side of the opening 404 flexes outward (or forward or backward) to allow the optical fiber 106 to be inserted past the projection 412 and into the opening 404 below the projections 412. The projections 412 prevent the optical fibers from exiting out of the openings 404 back up and through the top surface 408. There are two projections illustrated in FIG. 8, but there could be a projection 412 on only one side and there need not be a chamfered surface 410. The openings 404 may be of any length as illustrated in FIG. 8. Indeed, there can be separate devices 350 for different numbers of optical fibers being reorganized. As such, the technician may have the option for using a smaller device (or thinner device given that the openings 404 extend from above the surface of the bottom portion 366 toward the top surface 408 of the dividers 406) to reorganize the optical fibers 106.

The device 350 may also have other ways to retain the optical fibers 106 within the openings 404 and not use the projections 412. As an example, the openings 404 may be only the width of the optical fiber, preventing the optical fiber from moving within the slot due to engagement of the optical fiber with the dividers 406. There may also be a pressure sensitive adhesive that is applied in the openings 404 to retain the optical fibers 106 therein. Alternatively, a cushioning film maybe applied to one or more walls of the openings 404 during the manufacturer of the fiber comb 402 to snuggly hold the optical fibers laid therein.

Additionally, a pin comb tool 420 may be beneficial to the user of device 350. In this case, the pin comb tool 420 has two rounded pins 422 that are spaced apart by about the diameter of an optical fiber 106. Thus, there is slightly more than 125 microns between the pins 422 if the optical fibers are uncoated and 250 microns if coated. The pin comb tool 420 is moved along the optical fibers 106 to align them in a ribbon configuration. This may be done after all of the optical fibers 106 are routed or may be done multiple times during the routing of the optical fibers 106. Once all of the optical fibers 106 are routed to a particular opening 404, the pin comb tool 420 will align the optical fibers 106 and the ends of the second grouping of optical fibers 106 can be ribbonized so that the order of the optical fibers 106 is maintained.

The device 350 preferably has the same features and elements as do the prior embodiments and are not discussed herein. This would include the walls, the locations for attachment of the lid, the passageways for the lid latches, etc.

Figure 9:
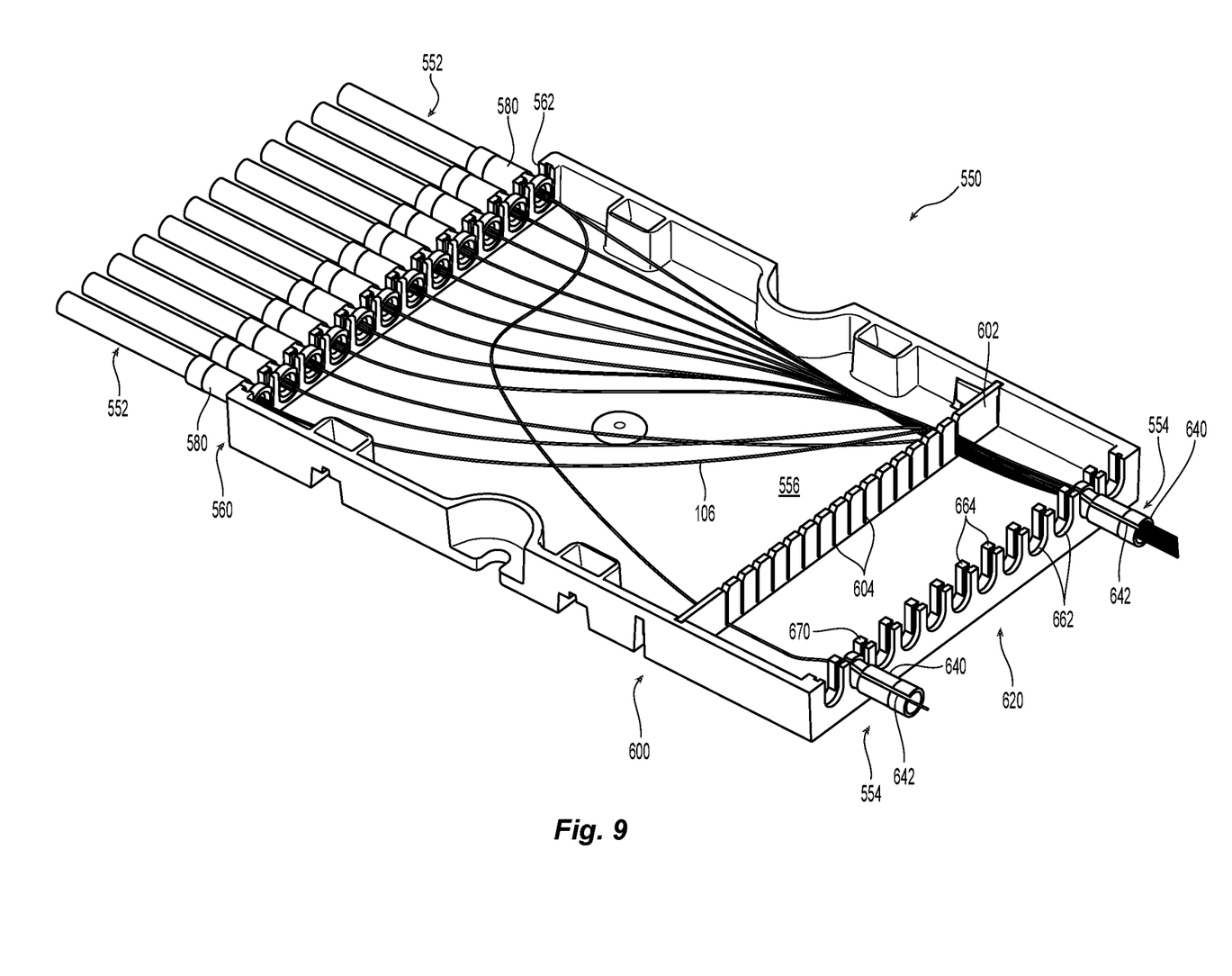
FIG. 9 is a top perspective view of a third embodiment of a device for reorganizing optical fibers according to the present invention and to be used with the crimp body and optical fibers of FIG. 1 and additional distal crimp bodies at the distal end.
Figure 10:
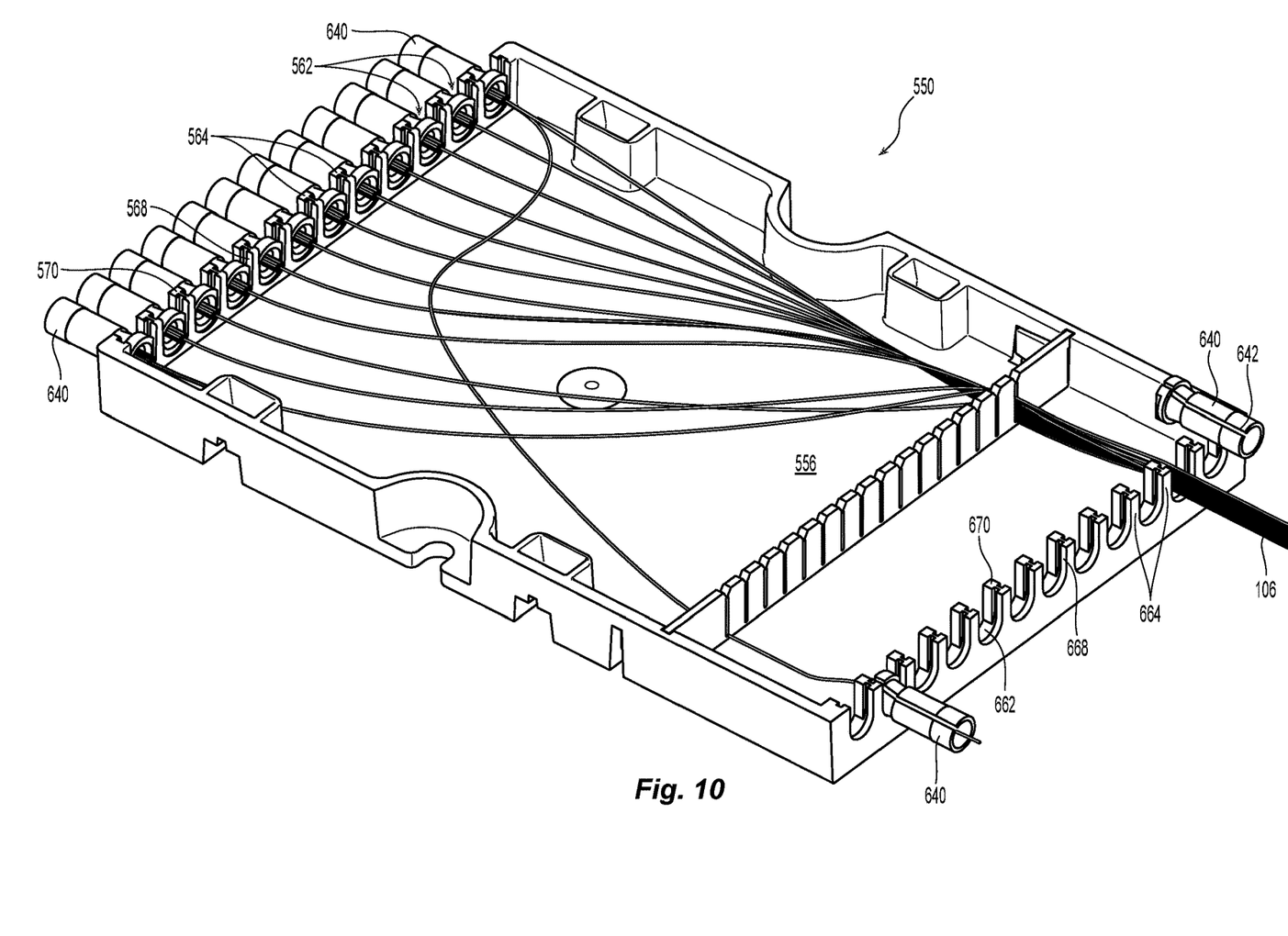
FIG. 10 is a perspective view of the third embodiment of a device for reorganizing optical fibers of FIG. 9, with the distal crimp body lifted out of the device.
Figure 11:
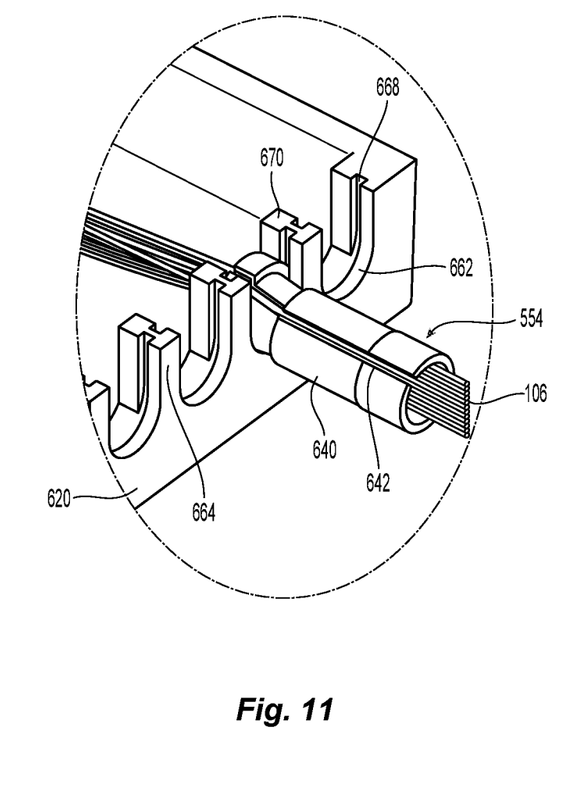
FIG. 11 is a perspective view of an enlarged portion of the distal end of the device for reorganizing optical fibers of FIG. 10 showing one distal crimp body with a slot.

Another embodiment of a device 550 for reorganizing optical fibers 106 from a first grouping or set 552 to a second grouping or set 554 is illustrated in FIGS. 9-11. The device 550 has a proximal end 560 having a number of openings 562 through which the optical fibers 106 in the first grouping 552 pass. There would be a number of proximal crimp bodies 580 at the proximal end 560. The proximal crimp bodies 580 and the openings 562 are preferably the same as in the first embodiment. That is, the openings 562 are essentially U-shaped and include a divider 564 between each of the openings to define each of the openings 562. The device 550 also has bottom portion 566, which may extend the length and width of the device 550 and acts as a tray to support and protect the optical fibers 106 from the surface on which the device 550 is placed. Each divider 564 has a slot 568 on either side thereof that extends from the top 570 of the dividers towards the bottom portion 566. Thus, each opening 562 has a slot 568 on each side to engage the proximal crimp body 580.

The device 550 has the same features in the center portion thereof as described above for the other embodiments, including the walls, the locations for attachment of the lid, the passageways for the lid latches, etc.

However, device 550 has a distal portion 600 with a fiber comb 602 with number of openings 604 to receive and organize the individual optical fibers 106. There may be a different number of openings at the proximal end 560 and in the fiber comb 602 or there may be the same number at each place. The fiber comb 602 may also be removably attached, fixedly attached, or integrally formed with the remainder of the device 550. The fiber comb 602 may correspond to either fiber comb 202 or fiber comb 402. As illustrated in FIG. 9, the fiber comb 602 is more similar to fiber comb 202, which does not have the projections extending into the openings 604.

The device 550 also has a distal end 620 where there are a number of openings 662 through which the optical fibers 106 in the second grouping 554 pass. There would be a number of distal crimp bodies 640 at the distal end 620. As illustrated in FIGS. 9-11, the openings 662 are essentially U-shaped and include a divider 664 between each of the openings to define each of the openings 662. Each divider 664 has a slot 668 on either side thereof that extends from the top 670 of the dividers towards the bottom portion 566. Thus, each opening 662 has a slot 668 on each side to engage the distal crimp body 640. The distal crimp body 640 has the same general configuration as the proximal crimp body 580, with one exception: a slot 642 along the length of distal crimp body 640. Thus, the distal crimp body 640 has a back portion with a thickness that corresponds to the width of the slots 668 in the device 550 and two flat surfaces to also engage an inside portion of the divider 664 to prevent rotation of the distal crimp body 640 relative to the device 550.

As noted above, the optical fibers 106 are routed and inserted into the openings 604 of the fiber comb 602 in the device 550. When the optical fibers 106 are all distributed to one of the openings 604, the ends of the optical fibers are ribbonized. See FIG. 10. The ribbonized optical fibers must then be inserted into the distal crimp body 640. It would be extremely difficult, if not impossible, to route the optical fibers 106 through the distal crimp body 640 and then ribbonize the optical fibers and keep the correct order. However, to keep the device 550 as small (thin) as possible, the opening through the distal crimp body 640 may be smaller than the ribbonized optical fibers 106. Thus, it would not be possible to feed the ribbonized optical fibers into the distal crimp body 640 without bending the optical fibers or the matrix used to ribbonize them. Therefore, the distal crimp body 640 may have a slot 642 along a length of the distal crimp body 640. This allows the optical fibers 106 to be inserted into the distal crimp body 640 where the optical fibers 106 are still loose relative to one another in the ribbonized portion to the right of the distal crimp body 640. The distal crimp body 640 can then be inserted into the opening 662 as illustrated in FIG. 11. At this point, the optical fibers 106 are strain relieved at both ends of the device 550.

Figures 12, 13:
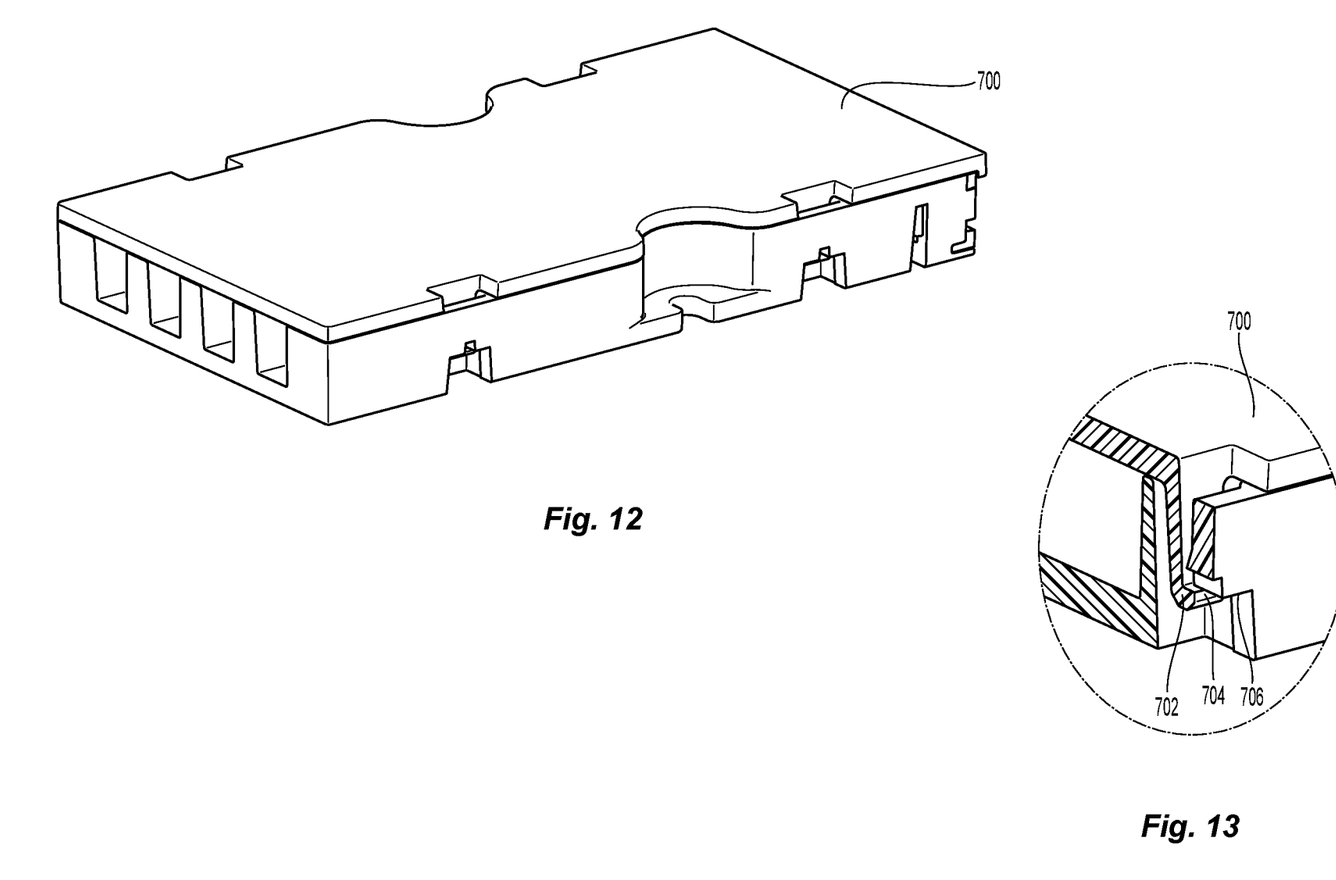
FIG. 12 is a perspective view of a device for reorganizing optical fibers with a lid according to one embodiment of the present invention.
FIG. 13 is a partial cross section of the device for reorganizing optical fibers and lid of FIG. 12 showing the latches on the lid and downward facing surfaces on the device.
Figure 14:
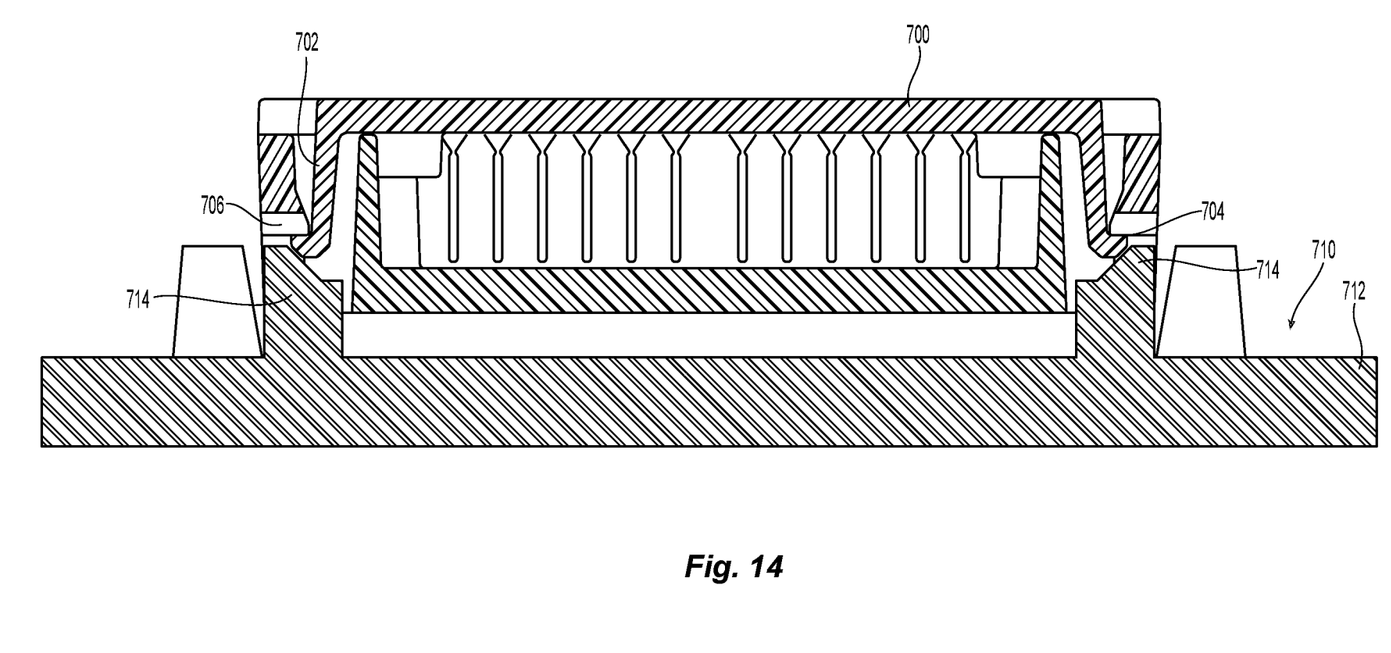
FIG. 14 a cross sectional view of the device for reorganizing optical fibers and lid of FIG. 12 and a tool used to release the lid from the device.

As noted above, the devices for for reorganizing optical fibers may also have a lid 700. One embodiment of a lid 700 is illustrated in FIGS. 12-14. The outer boundaries of the lid 700 preferably follow the walls and the proximal and distal ends of the device. However, other configurations are possible. The lid 700, when in use, helps to keep the optical fibers 106 secure within the devices. In the above-described devices, the lid 700 also assists in keeping the crimp bodies (proximal and distal) within their respective openings.

As can be best seen in FIG. 14, the lid has a number of latches 702 (four are illustrated for lid 700 in the figures) that engage a portion of devices. The latches 702 preferably correspond to the passageways (e.g. passageway 250 in FIG. 2). The latches 702 have an upward facing surface 704, which engages a downward facing surface 706 in the passageway in the devices. The downward facing surface 706, and latches 702 engaged therewith, are preferably not easily accessible, preventing unauthorized access to the optical fibers in the devices. These may be referred to as dead-man latches.

A latch tool 710 is available to disengage the latches 702 from their respective downward facing surface 706. The latch tool 710 preferably is a base 712 with a corresponding number of chamfered projections 714 extending up from the base 712 and corresponding to the passageways and downward facing surfaces 706 of the devices. Using the locations (such as 240 in FIG. 2), the user aligns the latch tool 710 and chamfered projections 714 with the passageways and pushes the device onto the latch tool 710. The chamfered projections 714 will bias the latches 702 away from the downward facing surfaces 706 of the devices, thereby releasing the lid 700.

Figure 15:
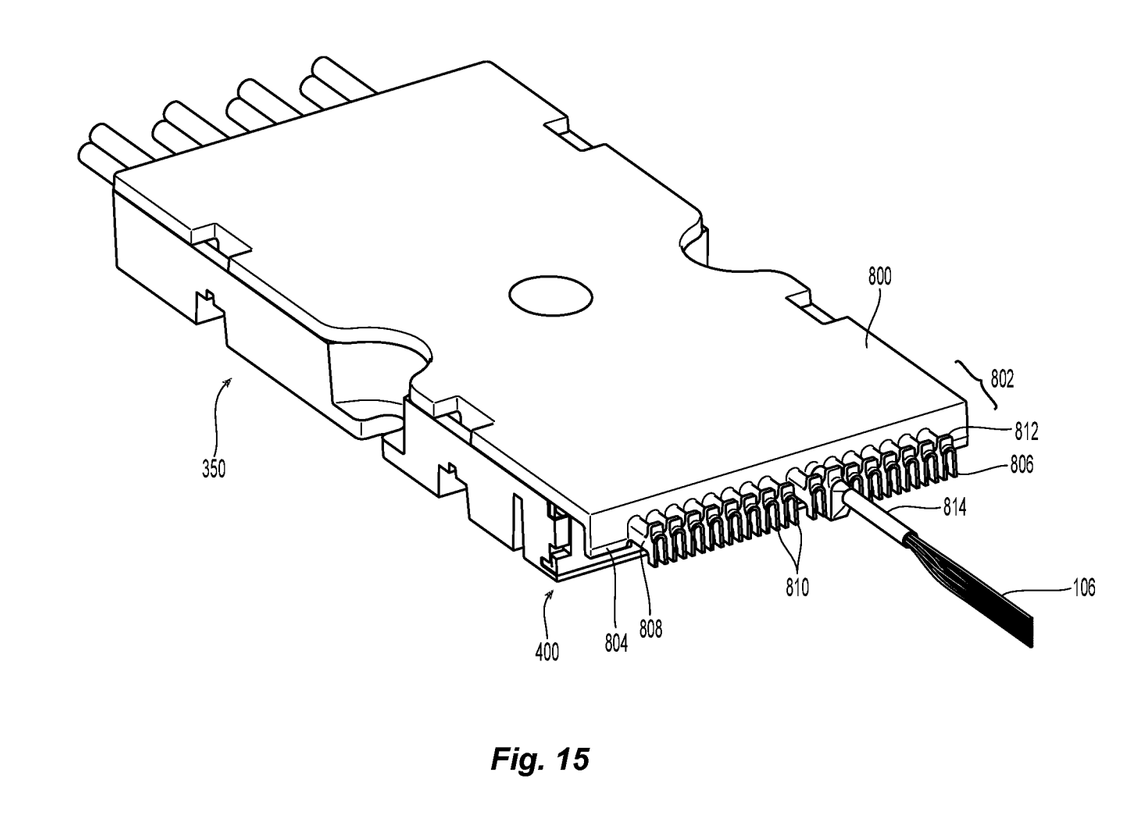
FIG. 15 is a perspective view of another embodiment of a device for reorganizing optical fibers with another embodiment of a lid according to one embodiment of the present invention.

An alternative lid 800 is illustrated in FIG. 15. While the lid 800 could be used with several of the devices, it is illustrated on device 350. The features of the device 350 will not be repeated here. The lid is similar to lid 700, except that lid 800 has a portion 802 that extends beyond the distal end 400 of device 350. The portion 802 includes a lip 804 extending downward in front of the fiber comb 402. The lip 804 has heat shrink tubing anchors 806 extending distally form the lip 804, preferably one heat shrink tubing anchor 806 for each of the openings 404 in the fiber comb 402. The heat shrink tubing anchor 806 has a bridge portion 808 extending from the lip 804 in a distal direction. The bridge portion 808 being u-shaped to allow the optical fibers 106 to pass out of the heat shrink tubing anchor 806. The heat shrink tubing anchor 806 also has two leg portions 810, extending downward from the bridge portion 808. The leg portions 810, along with a top projection 812 on the bridge portion 808, provide an anchoring structure for a heat shrink 814. See FIG. 15. The heat shrink tubing anchor 806 and the heat shrink 814 wrapped around the optical fibers 106 provide strain relief for the optical fibers 106 as they exit the device 350.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A device for reorganizing optical fibers from a first grouping to a second grouping comprising:
    a proximal end having at least one opening, the at least one opening engaging at least one proximal crimp body, the optical fibers passing through the at least one proximal crimp body and the at least one opening; and
    a distal portion having a first plurality of openings through which the optical fibers pass, each of the first plurality of openings having a divider therebetween, each opening in the first plurality of openings having a width that is less than twice the optical fiber's diameter.

2. The device for reorganizing optical fibers according to claim 1, wherein the at least one opening comprises a plurality of openings and the at least one proximal crimp body comprises a plurality of proximal crimp bodies, each of the plurality of openings engaging one of the plurality of proximal crimp bodies.

3. The device for reorganizing optical fibers according to claim 1, wherein the at least one proximal crimp body engages a structure in the at least one opening to prevent relative movement between the at least one proximal crimp body and the proximal end.

4. The device for reorganizing optical fibers according to claim 3, wherein the structure in the at least one opening is a groove and the at least one proximal crimp body has a projection to engage the groove.

5. The device for reorganizing optical fibers according to claim 3, wherein the structure in the at least one opening is a groove on either side of the at least one opening and the at least one proximal crimp body has a projection to engage each of the grooves.

6. The device for reorganizing optical fibers according to claim 1, wherein the optical fibers are partially disposed within a cable, the cable being strain-relieved to the device by a crimp band securing a portion of the cable to the at least one crimp body.

7. The device for reorganizing optical fibers according to claim 1, further comprising a distal end having at least one distal opening, the at least one distal opening engaging at least one distal crimp body, the optical fibers passing through the at least one distal crimp body and the at least one distal opening, the distal portion being disposed between the proximal end and the distal end.

8. The device for reorganizing optical fibers according to claim 7, wherein the at least one distal crimp body has a slot extending along a length of the at least one distal crimp body.

9. The device for reorganizing optical fibers according to claim 7, wherein ends of the optical fiber are ribbonized prior to being passed through the at least one distal crimp body.

10. The device for reorganizing optical fibers according to claim 7, wherein the at least one distal crimp body engages a structure in the at least one distal opening to prevent relative movement between the at least one distal crimp body and the at least one distal end.

11. The device for reorganizing optical fibers according to claim 1, further comprising a lid, the lid having a main body portion with at least four edges and a plurality of latches extending downward from the lid to engage downward facing surfaces in the device.

12. The device for reorganizing optical fibers according to claim 11, wherein the lid extends distally beyond the distal end, the lid having attachment members to receive a heat shrink tubing to surround optical fibers exiting the device through the lid.

13. The device for reorganizing optical fibers according to claim 11, further comprising openings in the device adjacent the downward facing surfaces to allow a tool access to the latches, whereby relative movement between the device and tool causes the latches to be disengaged from the downward facing surfaces.

14. The device for reorganizing optical fibers according to claim 1, wherein the distal portion is removable from the device.

15. A device for reorganizing optical fibers from a first grouping to a second grouping comprising:
    a proximal end having at least one opening, the at least one opening engaging at least one proximal crimp body, the optical fibers passing through the at least one proximal crimp body and the at least one opening;
    a distal portion having a first plurality of openings through which the optical fibers pass, each of the first plurality of openings having a divider therebetween, each of the first plurality of openings having a width that is less than twice the optical fiber's diameter; and
    two side walls extending between the proximal and distal portion to generally form a rectangular structure.

16. The device for reorganizing optical fibers according to claim 1, wherein the distal portion is removably connectable to the side walls.

17. A device for reorganizing optical fibers from a first grouping to a second grouping comprising:
    a proximal end having at least one opening, the at least one opening engaging at least one proximal crimp body, the optical fibers passing through the at least one proximal crimp body and the at least one opening; and
    a distal portion having a first plurality of openings through which the optical fibers pass, each of the first plurality of openings having a divider therebetween.

* * * * *